United States Patent [19]
Kitai et al.

[11] 3,810,224
[45] May 7, 1974

[54] FOCAL PLANE SHUTTER FOR CAMERA

[75] Inventors: Kiyoshi Kitai, Tokyo; Eiichi Onda, Saitama; Mitsuo Koyama, Chiba; Shinji Nagaoka, Chiba; Tadashi Nakagawa, Chiba, all of Japan

[73] Assignee: Seiko Koki Kabushiki Kaisha, Tokyo, Japan

[22] Filed: Mar. 13, 1973

[21] Appl. No.: 340,876

[30] Foreign Application Priority Data
March 15, 1972   Japan............................ 47/26293

[52] U.S. Cl. ................................................. 95/59
[51] Int. Cl. ............................................ G03b 9/26
[58] Field of Search ....................... 95/55, 58, 59, 60

[56] References Cited
UNITED STATES PATENTS

| | | | |
|---|---|---|---|
| 3,580,156 | 5/1971 | Loseries................................ | 95/60 |
| 3,628,438 | 12/1971 | Loseries................................ | 95/55 |

Primary Examiner—Joseph F. Peters, Jr.
Attorney, Agent, or Firm—Robert E. Burns; Emmanuel J. Lobato

[57] ABSTRACT

A focal plane shutter of a camera having two sets or groups of blades. One set of shutter blades opens the shutter aperture and the second set of shutter blades closes the aperture. Both sets of shutter blades are actuated in the same direction for opening the shutter and closing it. The shutter blades are actuated by principal and supplementary driving members of respective driving mechanisms. Each driving mechanism has a principal or main driving lever that drives the shutter blades of a corresponding set of shutter blades except one which is driven stably and uniformly by a corresponding auxiliary driving member.

3 Claims, 9 Drawing Figures

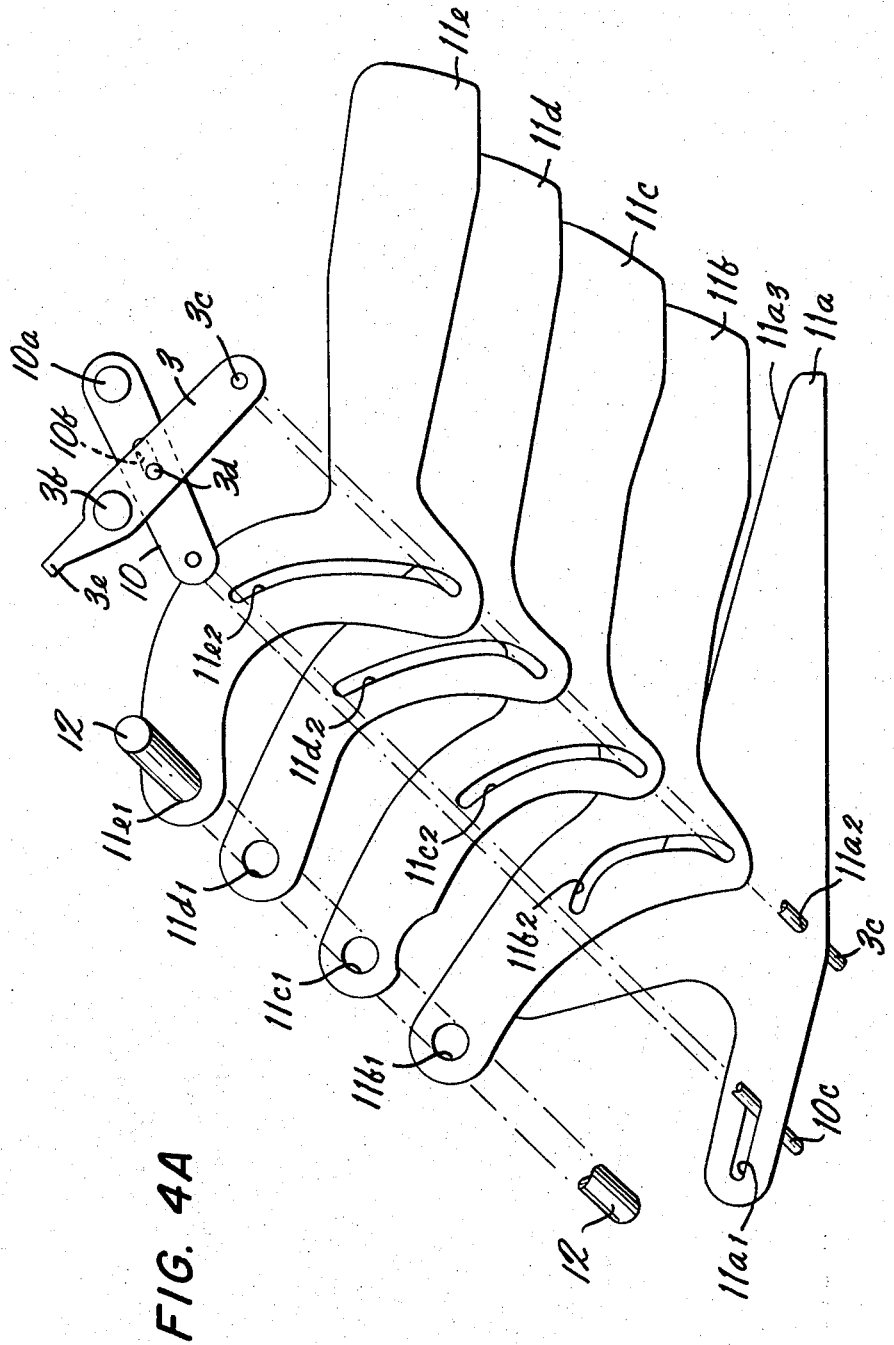

FOCAL PLANE SHUTTER FOR CAMERA

BACKGROUND OF THE INVENTION

The present invention relates generally to camera shutters and more particularly to a focal plane shutter for a camera.

In order to construct a camera of light weight which can be conveniently carried, the camera parts should be miniaturized as much as possible. In cameras using focal plane shutters, reducing the size of this type of shutter has been a problem. Some focal plane shutters use a screen made of cloth which does not have adequate characteristics for temperature changes. Accordingly, it has been a practice to use metallic shutter screens.

Focal plane shutters are known in which a plurality of shutter blades are used. In these known focal plane shutters the blades are mounted on the actuating or driving members so that the construction thereof has been complicated, as well as the fact that there has been a limit as to support for the blades so they have been divided into sets. Moreover, in the known focal plane shutters having small shutter blades, there have been made constructions in which the formation or development of the opening and closing slits have been impossible to maintain uniform.

SUMMARY OF THE INVENTION

It is a principal object of the present invention to provide a focal plane shutter which can be constructed of minimum size.

Another object of the present invention is to provide a focal plane shutter constructed small-sized and having means for developing excellent uniform exposure slits.

In the focal shutter of the invention, a plurality of shutter blades are divided into two sets of groups. One set is used for opening the shutter, and the second set closes the shutter. Both sets are actuated in the same direction in opening the shutter and closing it for carrying out an exposure. The sets of shutter blades are driven by two different sets of driving levers or mechanisms each comprising a principal driving lever and a supplemental or auxiliary driving lever which operates in a direction opposite the principal driving lever. Individual blades from each set of blades form the slits under control of the combined action of the principal driving lever and the auxiliary driving lever. The blades that do not participate in the slit formation are actuated by the principal driving lever.

BRIEF DESCRIPTION OF THE DRAWINGS

FIG. 4a is an exploded view of a set of shutter-opening blades of the shutter in FIG. 1;

Other features and advantages of the focal plane shutter according to the invention will become apparent from the following description of an example of the invention, and the novel features will be particularly pointed out in the appended claims.

DESCRIPTION OF THE PREFERRED EMBODIMENTS

Figure 1:
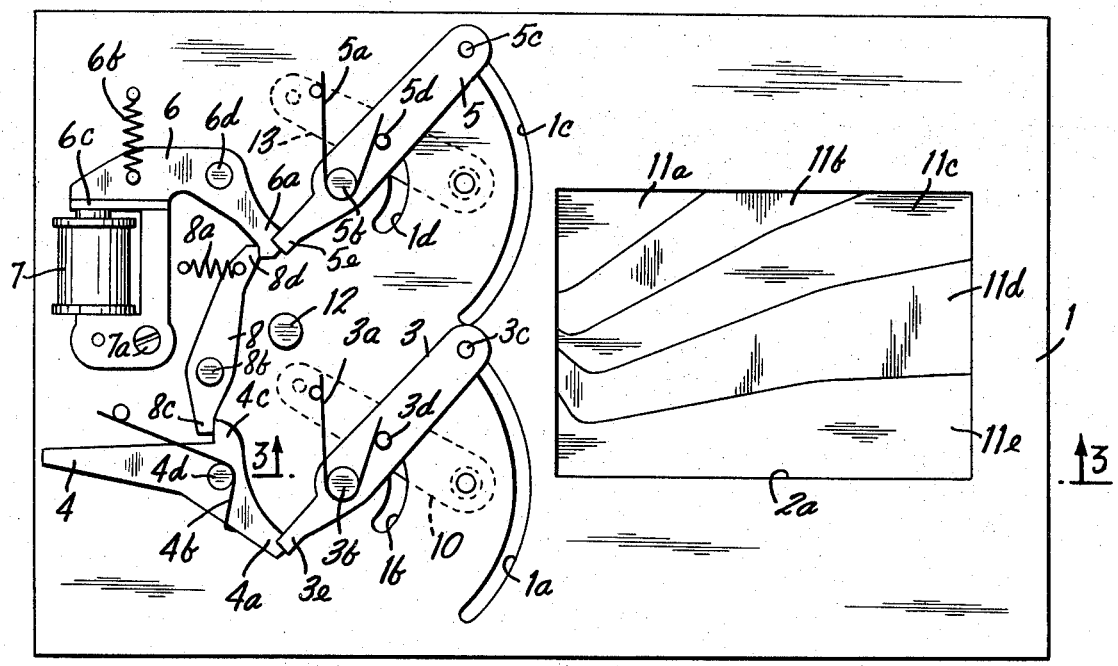
FIG. 1 is a plan view of a focal plane shutter embodying the invention.

The shutter shown in the drawings is illustrated in FIG. 1 in a cocked condition. It has a shutter base plate 1 having a window or shutter exposure aperture 2a. Next to the exposure aperture is mounted a shutter-opening lever 3 biased in a clockwise direction by a spring 3a and rotatably pivoted on a pivot 3b on the base plate 1. The shutter-opening driving member or lever 3 has a driving pin 3c fixed thereon, which extends into an arcuate slot 1a on the base plate 1 and a connecting pin 3d extending through an arcuate slot 1b in the base plate 1. The opening lever has an extension 3e received in a shoulder or step 4a of a release lever 4 so that it can be releasably maintained in a set or cocked state in which it is illustrated in FIG. 1. The release lever 4 is biased in a counterclockwise direction by a biasing spring 4b, and is provided with a stop projection 4c. A pivot 4d mounts it pivotally on the base plate.

A separate driving mechanism than the shutter-opening mechanism is provided in the shutter for closing the shutter. The shutter-closing mechanism comprises a shutter-closing driving lever 5 biased in a clockwise direction by biasing spring 5a about a pivot 5b mounted on the base plate 1. The shutter-closing lever 5 is provided with a closing driving pin 5c and a connecting pin 5d extending into and through respective arcuate slots 1c and 1d in the base plate. An extension 5e on the shutter-closing lever is engaged in a notch or step 6a of a closing pawl 6 biased in a clockwise direction by a spring 6b and which is provided with a magnetic part or element 6c. The pawl 6 is capable of pivotal movement about a pin 6d in a clockwise direction under the control of the spring and is held in a position locking the shutter-closing lever 5 when the magnetic part 6c is attracted electromagnetically by an electromagnet 7 fixed by a fastener 7a to the base plate 1. The electromagnet 7 is controllably energized by an electronic circuit, not shown. The circuit is constructed to energize the electromagnet while an exposure is being taken and is de-energized to terminate the exposure in known manner.

Figure 2:
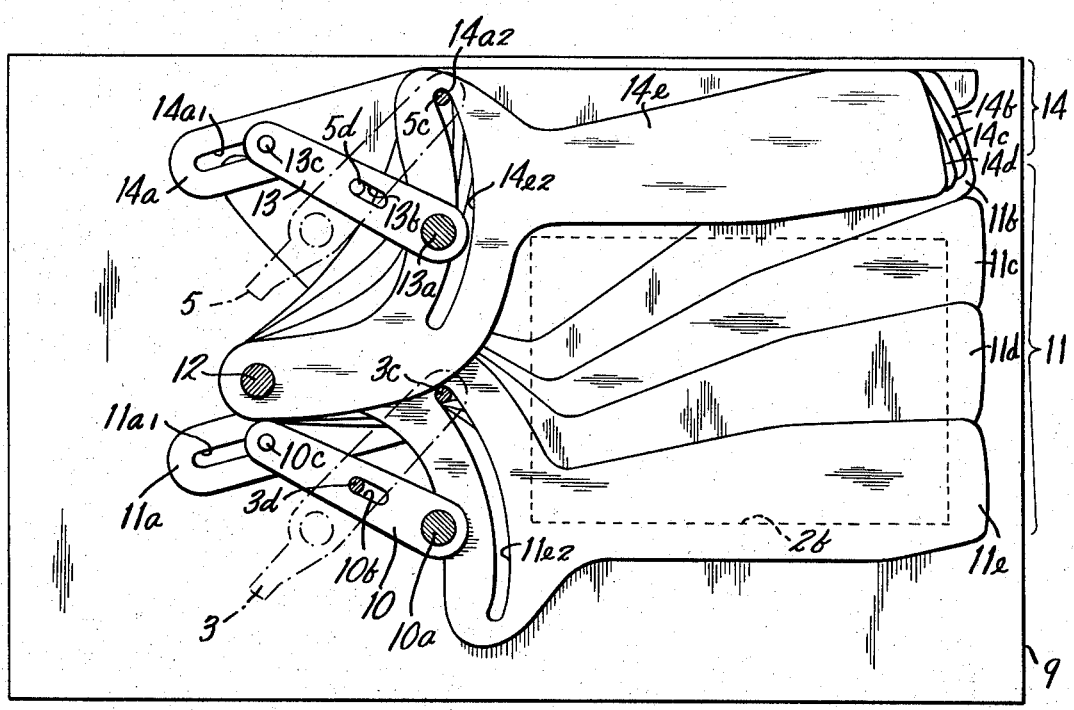
FIG. 2 is a plan view of the internal assembly of the shutter in FIG. 1.

A lock lever 8, locking both the release lever 4 and the closing pawl 6, is biased in a counterclockwise direction by a weak spring 8a about a pivot 8b and has an arm 8c that fits into the stop projection 4c of the release lever 4. The latter is biased in a counterclockwise direction so that the projection or arm 8c is biased rotationally in a clockwise direction so that the lock lever 8 is biased against the action of the weak spring 8a. Biasing of the lock lever takes place under the control of the release lever spring 4b, which is relatively strong, so its end 8d applies pressure against the closing pawl 6 until the magnetic part 6c is brought into contact and pressed against the electromagnet so that it comes to a standstill. When the electromagnet is energized, it is releasably held there. The focal plane shutter, as shown in FIG. 2, has a holding plate 9 mounted on the base plate 1, by means not shown, defining a space between the two plates 1, 9. An opening or window defines an exposure aperture 2b in registry with the opening or aperture 2a in the base plate 1. On the backside of the base plate, and within the space defined between the two plates, is mounted an auxiliary or supplementary opening lever 10 pivotally mounted on a pivot 10a and having an elongated slot 10b wherein is received the connecting pin 3d of the opening lever 3. The auxiliary lever 10 has an opening pin 10c extending into an elongated slot $11a_1$ of a slit-forming shutter blade 11a.

A set of group 11 of shutter-opening blades 11a – 11e are disposed superposed within the space between the shutter plates 1, 9. The slit-forming blade 11a is provided with a hole $11a_2$ wherein the opening driving pin 3c of the driving lever 3 is disposed. The other opening blades 11b – 11e each have arcuate slots $11b_2$ – $11e_2$, wherein the driving pin 3c extends therethrough and holes $11b_1$, $11c_1$, $11d_1$, $11e_1$ wherein a pivot pin 12 fixed to the base plate 1 is fitted.

An auxiliary, shutter-closing, driving lever 13 pivoted on a pivot 13a is mounted on the back surface of the base plate 1 and is provided with an elongated slot 13b wherein the connecting pin 5d of the shutter-closing lever 5 is disposed. The auxiliary shutter-closing lever 13 is provided with a driving closing pin 13c.

A second set 14 of shutter blades, constituting the shutter-closing blades, is disposed within the shutter space formed by the plates. This set constitutes a slit-forming blade 14a and other closing shutter-blades 14b–14e. The slit-forming shutter blade likewise has a slit $14a_1$ wherein the closing pin 13c is disposed, and a hole $14a_2$ wherein the closing driving pin 5c is disposed. Each of the shutter-closing blades 14b–14e have individually elongated, arcuate slots $14b_2$–$14e_2$ through which the closing driving pin 5c extends and respective holes $14b_1$–$14e_1$ wherein the fixed pivot pin 12 is disposed.

Figure 3:
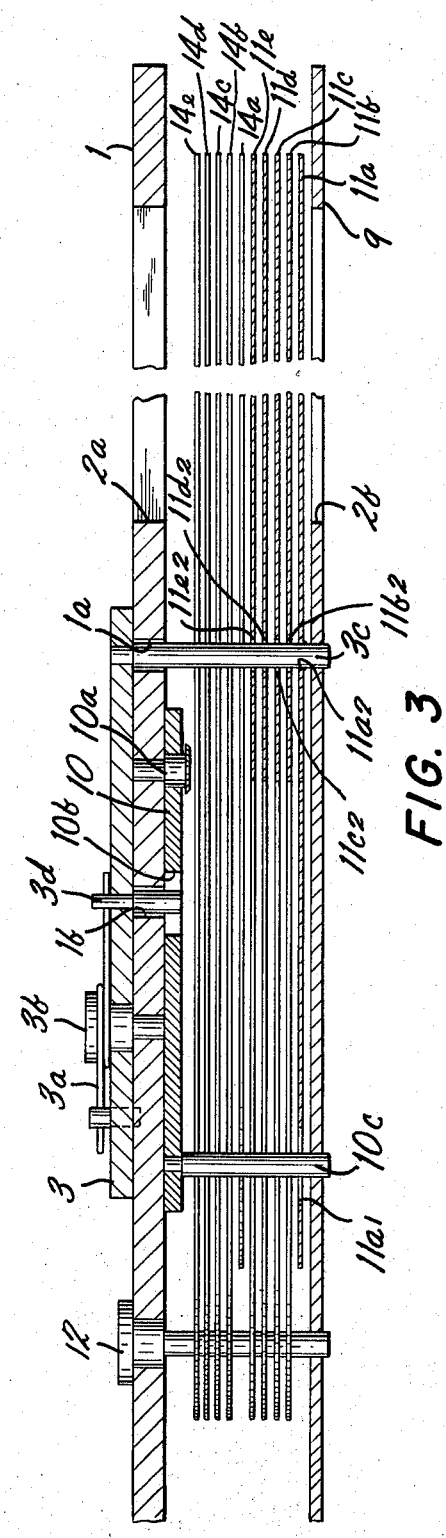
FIG. 3 is a cross-section view taken along line 3—3 of FIG. 1.
Figure 4B:
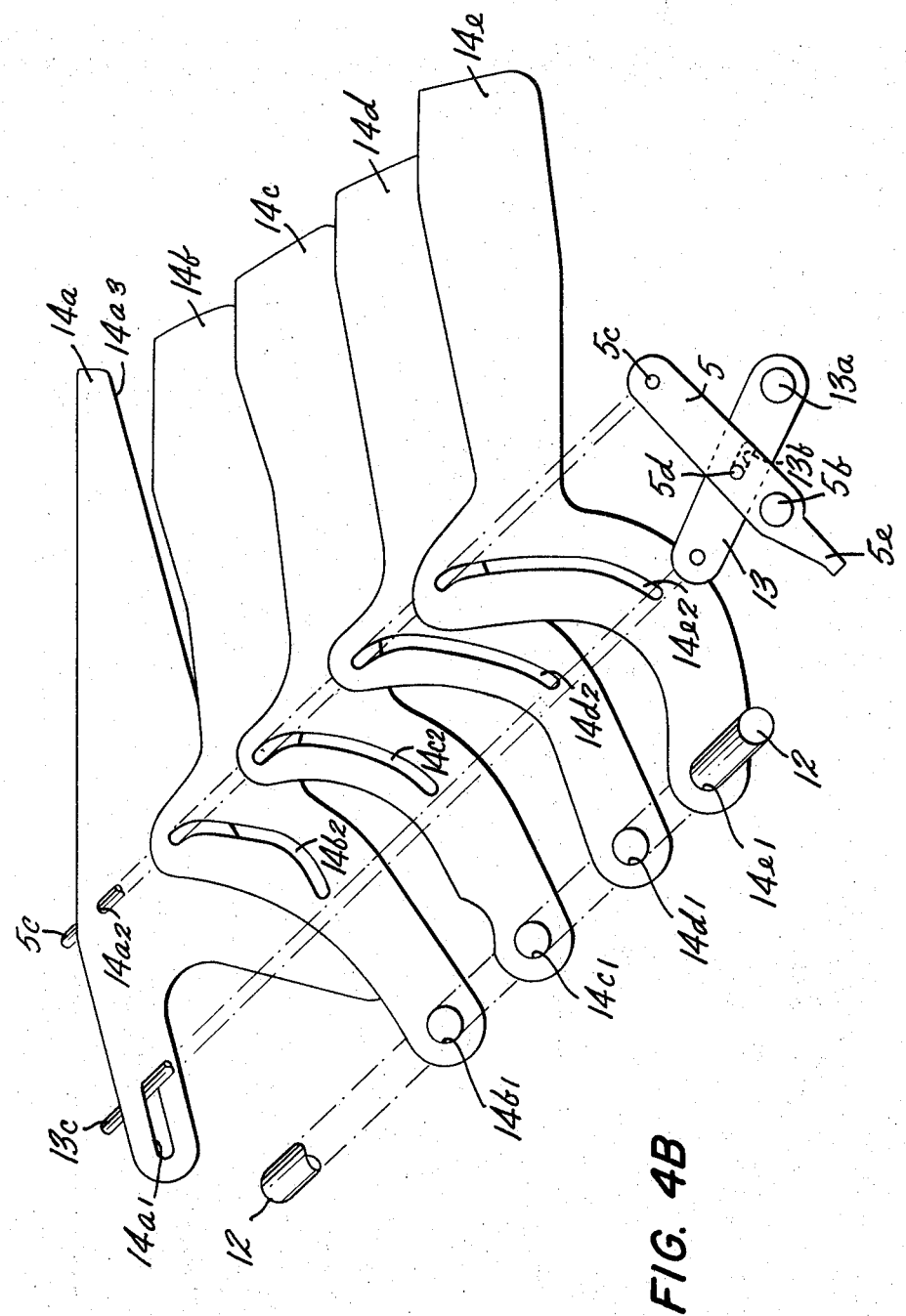
FIG. 4b is an exploded view of a set of shutter-closing blades of the shutter in FIG. 1.

The two sets of shutter blades are arranged in a superposed relationship, as illustrated in FIG. 3, within the space between the two plates 1, 9. Moreover, in order to insure that the formation of the slits in opening and closing the shutter are performed easily and uniformly, the mechanisms for opening and closing the blades are arranged symmetrically relative to the shutter aperture.

MODE OF OPERATION

The shutter is shown in a set or cocked condition in FIG. 1. It is settable in this condition after the individual exposures by a mechanism not shown. When an exposure is taken, the camera release lever or exposure lever, not shown, is actuated and because of its actuation the exposure control circuit of the camera, not shown, energizes the electromagnet 7 and the closing pawl will be held releasably by the attraction of the electromagnet. As the camera exposure lever continues its movement a mechanism associated therewith, not shown, rotates the shutter release lever 4 in a clockwise direction against the action of its biasing spring 4b. Its stop projection 4c releases the lock lever 8 so that it is rotated counterclockwise under the action of its biasing spring 8a. This rotation releases the closing pawl 6 but since it is now being attracted by the energized electromagnet, the blade closing mechanism is kept disenabled.

The shutter blade opening mechanism on the other hand is enabled or activated by the clockwise rotation of the release lever 4. The shutter opening driving lever 3 is driven by its spring 3a and its driving pin 3c and its connecting pin 3d are driven along with it. The supplementary or auxiliary driving lever is driven in a counterclockwise direction by the connecting pin 3d as the main driving lever 3 is driven clockwise and it will thus actuate the slit-forming shutter blade 11a.

Figure 5:
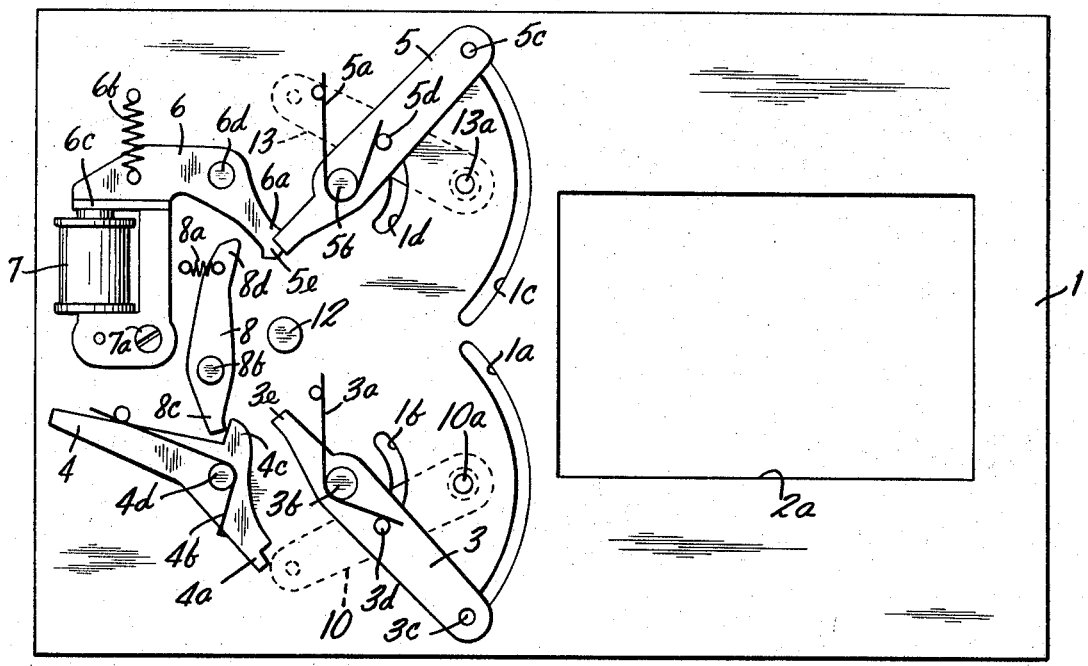
FIG. 5 is a plan view illustrating mechanism for opening the shutter blades and the shutter aperture in an open condition.
Figure 6:
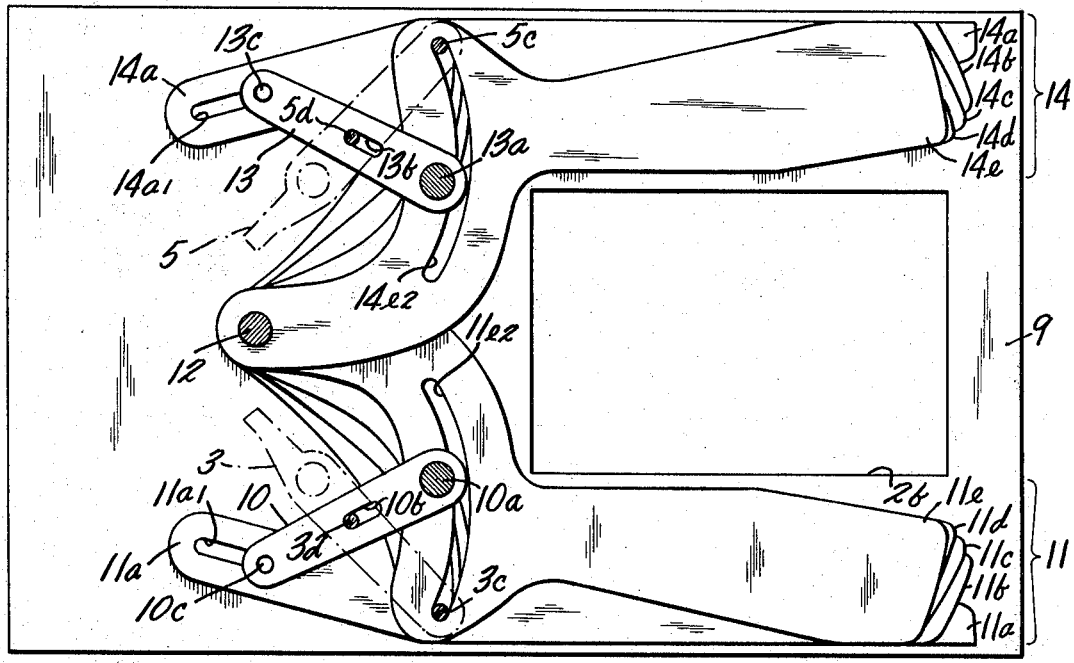
FIG. 6 is a plan view internally of the shutter illustrating the condition or state of the shutter blades inside the shutter in the same condition of the shutter as in FIG. 5.

It will be noted that the driving pin 3c is at one end of the arcuate slot $11e_2$ of the shutter-opening blade 11e. As it travels, it moves the opening blades successively from a fan-shaped position in the cocked condition of the shutter to a completely superposed condition illustrated in FIGS. 5 and 6 when the shutter is open. The slit-forming shutter blade 11a has a trailing edge $11a_3$ and this blade is the last of the blades moving in the sequence of blades opening the shutter aperture. The trailing edge $11a_3$ insures an accurate aperture slit is maintained in the opening thereof. The separate or auxiliary drive member 10 likewise insures the slit-forming blade is accurately driven at a uniform speed. The load on the pin 3c varies as the opening blades are actuated to open the shutter. The sole slit-forming shutter blade 11a driven by the auxiliary drive lever 10 is thus driven at a more stable and uniform rate since it is moved by a simple movement of the auxiliary drive lever. The slit-forming edge $11a_3$ trails the entire blade group 11 defining a stable, uniform opening of the shutter.

The length of the photographic exposure or exposure delay time is determined by the automatic control circuit which develops a trigger signal for automatically de-energizing of the electromagnet in known manner. When the electromagnet is de-energized, the closing pawl 6 is released and it rotates clockwise under control of its biasing spring 6b. This releases the shutter-closing driving lever 5 so that it rotates clockwise under control of its driving spring 5a.

Figure 7:
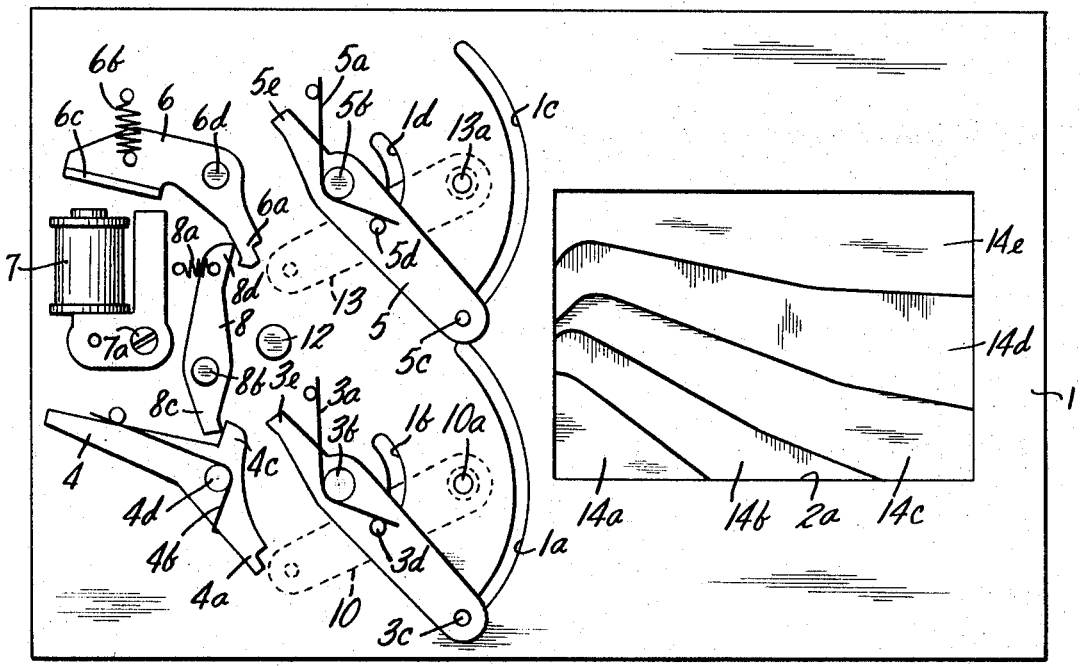
FIG. 7 is a plan view of the shutter of FIG. 1 with the shutter blades closed after taking an exposure.
Figure 8:
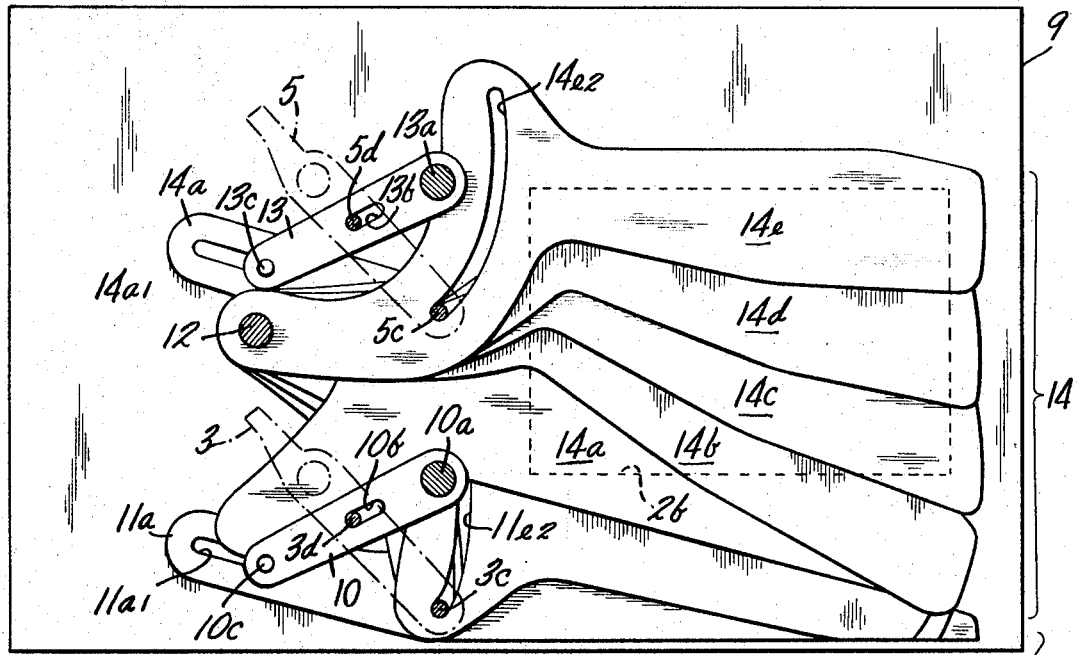
FIG. 8 is a plan view internally of the shutter illustrating the shutter blades when the shutter is the condition illustrated in FIG. 7.

As the main shutter-closing lever 5 rotates it carries its driving pin 5c and its connecting pin 5d with it. The driving pin 5c will drive the shutter-closing blades 14b–14e from the stacked superposed position in FIG. 2 to a fan-shaped position shown in FIGS. 7 and 8 closing the shutter. The second set of blades are actuated in a sequence in the same direction in which the shutter-opening blades are actuated.

The connecting pin 5d of the main shutter-closing lever 5 actuates the auxiliary closing lever 13 in a direction opposite to the travel of the main shutter-closing lever so that the slit-forming shutter closing blade 14a is actuated separately from the other shutter-closing blades. The slit-forming shutter-closing blade 14a has a leading edge $14a_3$ which moves forwardly ahead of the other shutter-closing blades and defines a stable slit uniformly closing the shutter aperture. This slit-forming, shutter-closing blade is driven separately by the driving pin 13c ahead of the other shutter-closing blades.

The focal plane shutter according to the invention makes it possible to make the shutter blades of thin sheet metal, for example, and of a small size so that the shutter can be made compactly. The division of the blades into two sets reduces the inertia of the blades and the further division of the individual sets by driving the individual blades controlling the forming of the aperture slits during the opening and closing of the shutter aperture reduces the inertia so that these two blades can be controlled stably and uniformly.

What we claim and desire to secure by letters patent is:

1. A focal plane shutter comprising, means defining a shutter aperture, a first set of shutter-opening blades closing the shutter aperture when the shutter is in a cocked condition, means pivotally mounting said first set of shutter-opening blades, shutter-opening mechanism having driving means for driving the first set of shutter-opening blades in a sequence for opening the shutter aperture, a second set of shutter-closing blades, means pivotally mounting said set of shutter-closing blades, a shutter-closing mechanism having driving means for driving the second set of shutter-closing blades sequentially from a rest position to individual positions for jointly closing the shutter aperture, both driving means comprising separate means driving said sets of shutter-opening blades and said shutter-closing blade independently in a same direction, said shutter-opening mechanism and said shutter-closing mechanism each including a set of driving levers, said set of driving levers comprising a main driven lever moved in one direction and an auxiliary lever driven in an opposite direction by the main lever, means coupling the main and auxiliary levers in each set of driving levers, and means coactive with each respective main lever for driving the respective set of shutter blades, and means coactive with the auxiliary levers for driving one of said shutter blades of a respective set independently.

2. A focal plane shutter according to claim 1, in which both of said mechanisms are mounted relative a same side of said shutter aperture.

3. A focal plane shutter according to claim 1, in which each of said mechanisms comprise respective means in said driving means for driving one of the blades of each of the sets of shutter blades independently of the remainder of shutter blades of the individual sets of shutter blades, each one of the independently driven shutter blades comprises a slit-forming blade edge surface.

* * * * *